(12) United States Patent
Pusheck et al.

(10) Patent No.: US 10,921,207 B2
(45) Date of Patent: Feb. 16, 2021

(54) SENSOR ASSEMBLY WITH LINEAR CONTACTS

(71) Applicant: VEONEER US INC., Southfield, MI (US)

(72) Inventors: Jacob Pusheck, West Bloomfield, MI (US); Joshua Forwerck, Royal Oak, MI (US)

(73) Assignee: VEONEER US INC., Southfield, MI (US)

( * ) Notice: Subject to any disclaimer, the term of this patent is extended or adjusted under 35 U.S.C. 154(b) by 296 days.

(21) Appl. No.: 15/938,667

(22) Filed: Mar. 28, 2018

(65) Prior Publication Data

US 2019/0301958 A1    Oct. 3, 2019

(51) Int. Cl.
*G01L 19/14* (2006.01)
*G01L 19/06* (2006.01)
*G01L 19/00* (2006.01)

(52) U.S. Cl.
CPC ........ *G01L 19/147* (2013.01); *G01L 19/0084* (2013.01); *G01L 19/0654* (2013.01)

(58) Field of Classification Search
CPC .............. G01L 19/147; G01L 19/0084; G01L 19/0654; G01D 11/245; G01D 11/24; G01D 11/30; G01F 1/684; G01F 1/00; G01F 1/05; G01F 1/76; G01F 1/86; G01F 1/58; G01F 1/584; G01F 1/56; G01F 1/60; G01F 1/32; G01F 1/3209; G01F 1/6845; G01F 1/34; G01F 1/38
See application file for complete search history.

(56) References Cited

U.S. PATENT DOCUMENTS

| | | | |
|---|---|---|---|
| 7,331,212 B2* | 2/2008 | Manlove | G01D 11/245 73/12.01 |
| 9,360,348 B2 | 6/2016 | Henzler et al. | 73/204.22 |
| 2008/0264181 A1* | 10/2008 | Sulouff | G01F 1/36 73/861.42 |
| 2010/0300207 A1* | 12/2010 | Ding | G01L 19/0069 73/721 |
| 2011/0203369 A1* | 8/2011 | Hoefer | B81B 7/0048 73/431 |

(Continued)

FOREIGN PATENT DOCUMENTS

EP    2036414    3/2009    ............. H05K 7/14

*Primary Examiner* — Harshad R Patel
*Assistant Examiner* — Nigel H Plumb
(74) *Attorney, Agent, or Firm* — Christopher P. Maiorana, PC (57) ABSTRACT

An apparatus including a first linear contact, a second linear contact and a support contact. The first linear contact and the second linear contact may each be connected to corresponding electrical terminals. The support contact may be connected to a housing. The first linear contact and the second linear contact may each provide an electrical connection between corresponding sensor contacts and the corresponding electrical terminals. The first linear contact, the second linear contact and the support contact may be arranged to create a support plane for a sensor package. The first linear contact and the second linear contact may each provide support for the sensor package along a linear peak. The apparatus may enable a secure compression fit of the sensor package within the housing.

20 Claims, 8 Drawing Sheets

(56) References Cited

U.S. PATENT DOCUMENTS

| | | | | |
|---|---|---|---|---|
| 2013/0170669 A1* | 7/2013 | Fukuzawa | G01L 9/0042 | 381/115 |
| 2014/0060169 A1* | 3/2014 | McNeil | B60C 23/0408 | 73/146.5 |
| 2014/0137656 A1* | 5/2014 | Henzler | G01L 19/143 | 73/756 |
| 2014/0311241 A1* | 10/2014 | Kitano | G01L 9/008 | 73/384 |
| 2014/0329344 A1* | 11/2014 | Schultz | H01L 22/14 | 438/17 |
| 2015/0330856 A1* | 11/2015 | Chiou | H01L 41/312 | 73/727 |
| 2015/0362394 A1* | 12/2015 | Shimoyama | G01L 9/0001 | 73/702 |
| 2016/0146685 A1* | 5/2016 | Chiou | G01L 9/0044 | 73/727 |
| 2016/0313164 A1* | 10/2016 | Schneider | G01F 15/18 | |

* cited by examiner

SENSOR ASSEMBLY WITH LINEAR CONTACTS

FIELD OF THE INVENTION

The invention relates to sensors generally and, more particularly, to a method and/or apparatus for implementing a sensor assembly with linear contacts.

BACKGROUND

Vehicles are equipped with pressure sensors to detect a change in pressure or perform other measurements. Many pressure sensors are designed with all the electronics integrated into a single package. To provide reliable sensor readings, the sensors rely on secure housings with electrical connections to external components. If the sensors are able to move within the housing, then the sensors will not generate accurate sensor readings. The sensors are highly sensitive and a slight misalignment, uneven seating or an added resistance to the sensor contacts can result in unreliable data.

It would be desirable to implement a sensor assembly with linear contacts.

SUMMARY

The invention concerns an apparatus comprising a first linear contact, a second linear contact and a support contact. The first linear contact and the second linear contact may each be connected to corresponding electrical terminals. The support contact may be connected to a housing. The first linear contact and the second linear contact may each provide an electrical connection between corresponding sensor contacts and the corresponding electrical terminals. The first linear contact, the second linear contact and the support contact may be arranged to create a support plane for a sensor package. The first linear contact and the second linear contact may each provide support for the sensor package along a linear peak. The apparatus may enable a secure compression fit of the sensor package within the housing.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a sensor assembly with linear contacts that may (i) securely seat a sensor within a housing, (ii) provide a reliable electrical contact, (iii) provide a level orientation, (iv) implement a compression fit, (v) prevent unreliable sensor data resulting from tolerance variations, (vi) provide robust electrical and mechanical connection and/or (vii) be implemented as one or more steps of an automated assembly process.

Figure 1:
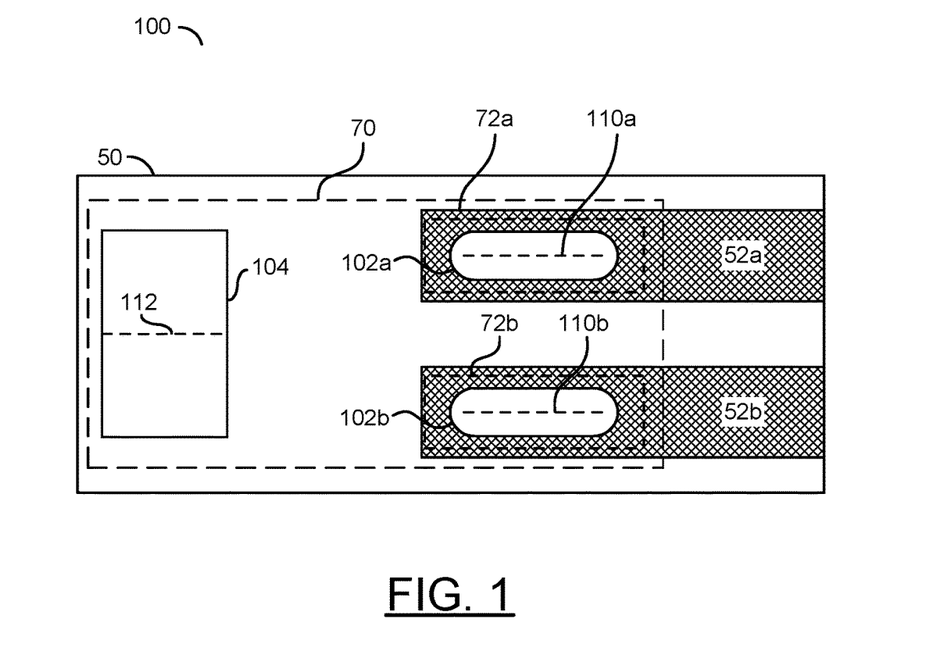
FIG. 1 is a diagram illustrating an example embodiment of an apparatus.

Referring to FIG. 1, a block diagram of an apparatus 100 is shown in accordance with an embodiment of the invention. A top-down view of the apparatus 100 is shown. The apparatus 100 may comprise linear contacts 102a-102b and/or a support contact 104. The apparatus 100 may be implemented within a housing 50. The apparatus 100 may be configured to provide support for a sensor package 70.

The housing 50 may comprise an electrical terminal 52a and an electrical terminal 52b. The terminals 52a-52b may provide an electrical connection to other components (e.g., components external to the housing 50, a CAN bus, an electronic control unit, a power source, etc.). The housing 50 may be configured to provide support, a seal (e.g., watertight) and/or protection for the sensor package 70. In one example, the housing 50 may be implemented as a component of a vehicle and the terminals 52a-52b may be configured to provide an electrical connection between the sensor package 70 and other components of the vehicle. Details of the housing 50 and/or the terminals 52a-52b may be described in association with FIGS. 12-18.

The sensor package 70 may implement a circuit package (e.g., integrated circuit module) for a sensing device. In one example, the sensor implemented by the sensor package 70 may be a pressure sensor. The sensor package 70 may comprise a contact 72a and a contact 72b. The contacts 72a-72b may provide connection leads to enable the sensor package 70 to transmit and/or receive electrical signals. To enable the sensor package 70 to communicate the sensor readings, the contacts 72a-72b may be connected to the electrical terminals 52a-52b. To enable the sensor package 70 to receive power, the contacts 72a-72b may be connected to the electrical terminals 52a-52b.

The sensor package 70 may comprise a sensor configured to read and/or detect one or more types of information about the operating environment. The sensor 70 is generally operational to convert a measurement into an electrical signal. In one example, the sensor 70 may implement an accelerometer. In another example, the sensor 70 may implement a pressure sensor (e.g., a gas pressure sensor suitable for automotive applications). In yet another example, the sensor 70 may implement a temperature sensor. In some embodiments, the sensor package 70 may have operating requirements of a stable environment to ensure accurate measurements (e.g., to measure an amount of acceleration in a particular direction). The sensor package 70 may operate in a high vibration environment. To ensure proper functionality and/or accurate readings by the sensor package 70, the apparatus 100 may secure the position/orientation of the sensor package 70 and/or ensure there is a consistent and reliable electrical contact.

The linear contacts 102a-102b may provide a connection between the sensor contacts 72a-72b and the terminals 52a-52b. The linear contacts 102a-102b may be implemented on the electrical terminals 52a-52b. In one example, the linear contacts 102a-102b may be attached to the terminals 52a-52b. In another example, the linear contacts 102a-102b may be integrated with the terminals 52a-52b (e.g., integrally formed). The linear contacts 102a-102b may be implemented using a conductive material. The shape, size and/or materials used to implement the linear contacts 102a-102b may be varied according to the design criteria of a particular implementation.

The support contact 104 may provide support and/or balance for the sensor package 70. In an example, the sensor package 70 may rest on the linear contacts 102a-102b and/or the support contact 104. The support contact 104 may be implemented using a conductive material and/or a non-conductive material. Whether the material of the support contact 104 is implemented as a conductive or non-conducting material may depend on a layout of the sensor contacts 72a-72b and/or other contacts implemented by the sensor package 70. In some embodiments, the support contact 104 may be implemented using the same material as the housing 50. In one example, the support contact 104 may be integrated (e.g., integrally formed together) with the housing 50. In another example, the support contact 104 may be implemented as a separate component from the housing 50 that is attached to the housing 50 (e.g., within a seating area).

Each of the linear contacts 102a-102b may comprise a respective linear peak 110a-110b. The linear peaks 110a-110b may be a length and/or strip of the linear contacts 102a-102b. The linear peaks 110a-110b may provide a support line for the sensor package 70. The sensor contacts 72a-72b may rest along the length of the linear peaks 110a-110b. For example, the linear peaks 110a-110b may contact the sensor contacts 72a-72b along the entirety of the length of the linear peaks 110a-110b and/or partially contact the sensor contacts 72a-72b and partially contact the plastic housing of the sensor package 70. The linear peaks 110a-110b may comprise a series of points of contact with the sensor contacts 72a-72b. For example, the linear contacts 102a-102b may generally have a domed shape and the linear peaks 110a-110b may be the top of the dome shape. In some embodiments, the linear peaks 110a-110b may comprise a line along the linear contacts 102a-102b. In some embodiments, the linear peaks 110a-110b may comprise an area (e.g., a two dimensional area) of the linear contacts 102a-102b.

Similarly, the support contact 104 may comprise a linear peak 112. In the example shown, the linear peak 112 may be oriented in parallel with the linear peaks 110a-110b. In some embodiments, the linear peak 112 may be oriented perpendicular to the linear peaks 110a-110b. Together, the linear peaks 110a-110b and the linear peak 112 may provide three linear sections of contact with the sensor package 70.

Figure 2:
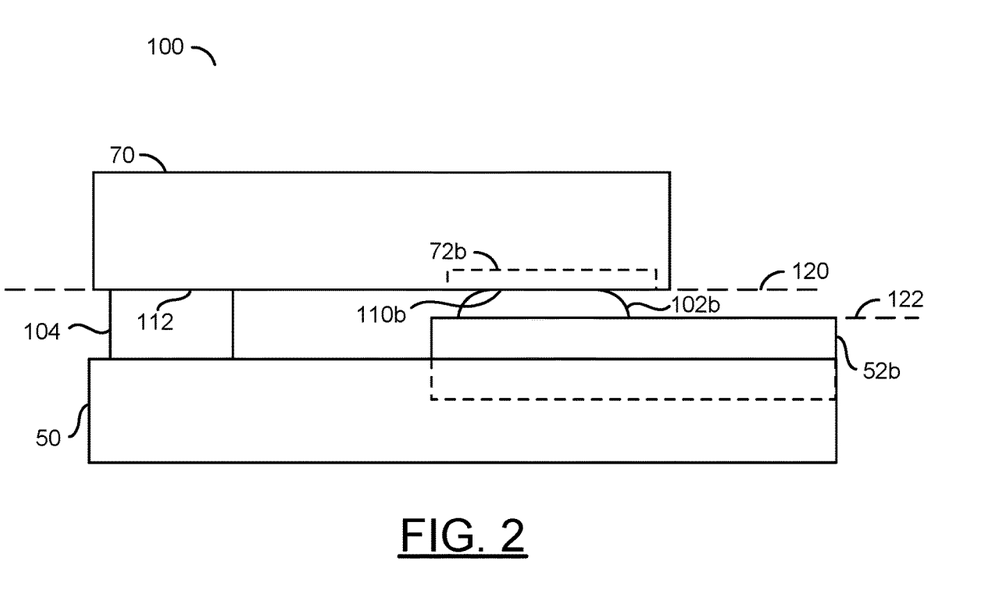
FIG. 2 is a diagram illustrating a side view of the apparatus.

Referring to FIG. 2, a diagram illustrating a side view of the apparatus 100 is shown. The sensor package 70 is shown supported by the support contact 104 (e.g., at the linear peak 112) and the linear contact 102b (e.g., the linear peak 110b). The linear contact 102a may be obscured by the linear contact 102b in the side view. The support contact 104 is shown extending from the housing 50. The linear contact 102b is shown extending from the terminal 52b.

A line 120 is shown. The line 120 may represent a plane. In the side view, only one axis of the plane 120 is shown. The linear peak 110b (and the linear peak 110a, obscured in the side view) and the linear peak 112 may be aligned on the plane 120 (e.g., reach up to the same height). The linear peaks 110a-110b and the linear peak 112 may be configured to ensure that the sensor package 70 is supported and level with the plane 120.

The terminal 52b is shown partially embedded within the housing 50. A top portion of the terminal 52b is shown above the housing 50. A bottom portion of the terminal 52b is shown in the housing 50. The amount of the terminals 52a-52b that are exposed (e.g., above the housing 50) may be varied according to the design criteria of a particular implementation.

A line 122 is shown. The line 122 may represent a plane. In the side view, only one axis of the plane 122 is shown. The plane 122 may represent a height of the terminals 122. The support contact 104 is shown having a height corresponding to a distance between a top surface of the housing 50 and the plane 120. Since the terminals 52a-52b extend above the top surface of the housing 50, the linear contacts 102a-102b may be shorter (e.g., in absolute height) than the support contact 104 in order to be at the same level of the plane 120. In the example shown, the linear contact 102b may have a height corresponding to a distance between the plane 120 and the plane 122.

Figure 3:
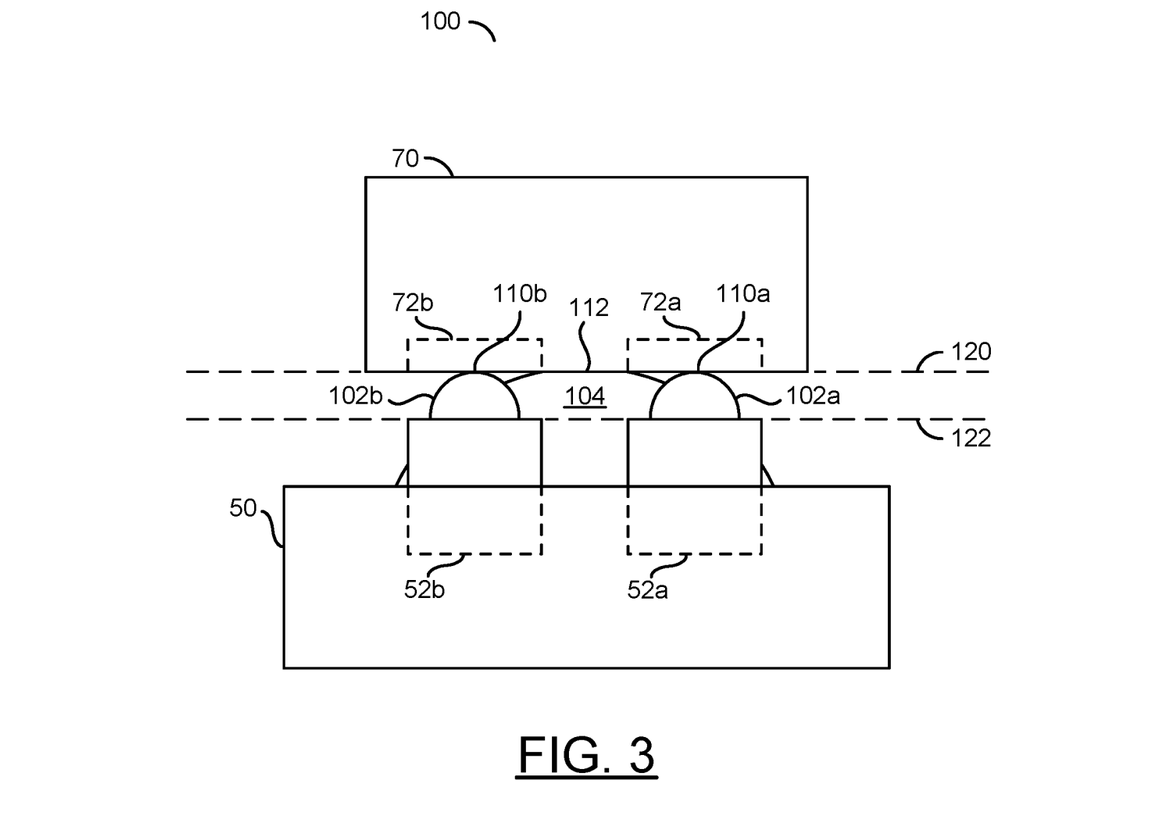
FIG. 3 is a diagram illustrating an alternate side view of the apparatus.

Referring to FIG. 3, a diagram illustrating an alternate side view of the apparatus 100 is shown. In the alternate side view, the linear contacts 102a-102b are shown in front of the support contact 104. The sensor package 70 is shown being supported on the linear peaks 110a-110b and the linear peak 112. The linear peaks 110a-110b and the linear peak 112 may keep the sensor package 70 steady on the plane 120.

The linear contacts 102a-102b are shown having a general dome and/or arched shape. The linear peaks 110a-110b are shown at an apex of the arc of the linear contacts 102a-102b. The linear peaks 110a-110b are shown touching the sensor contacts 72a-72b. The linear peaks 110a-110b may ensure a consistent and/or reliable electrical connection with the sensor contacts 72a-72b.

Similarly, the support contact 104 is shown having a general dome and/or arched shape. The linear peak 112 is shown at an apex of the arc of the support contact 104. The linear peak 112 is shown touching the sensor package 70.

The apparatus 100 may be configured to electronically connect to the terminals 52a-52b of the sensor package 70 by means of a compression fit. The flat sensor pads 72a-72b on the sensor component 70 may be pressed against the linear connectors 102a-102b to connect to the terminals 52a-52b. To enable the sensor 70 to perform accurately, the sensor 70 may lie on a flat plane (e.g., the plane 120) including the connection line between the two sensor pads 72a-72b. Providing the flat plane 120 may ensure a reliable electrical connection between the sensor contacts 72a-72b, the linear contacts 102a-102b and the terminals 52a-52b. The reliable electrical contact may ensure that there is no biasing or added resistance caused by an incomplete (e.g., compromised) electrical connection.

The plane 120 may consist of the two sensor contacts 72a-72b and a third elsewhere on the plastic housing of the sensor package 70. The three contacts (e.g., the linear contacts 102a-102b and the support contact 104) may be used to create the plane 120. The apparatus 100 may provide a resistance to tolerance variations in the future by ensuring that the plane of contact 120 be made within a wide range of tolerance allowances. The two linear contacts 102a-102b may connect to the sensor pads 72a-72b (one each) and the support contact 104 may be integrated into the housing 50. The linear peaks 110a-110b may enable a linear contact and the design of the housing 50 (e.g., the support contact 104) may provide a robust third line of contact (e.g., the linear peak 112). The apparatus 100 may ensure a robust electrical and mechanical connection between the sensor component 70 and the receiving housing 50.

Figure 4:
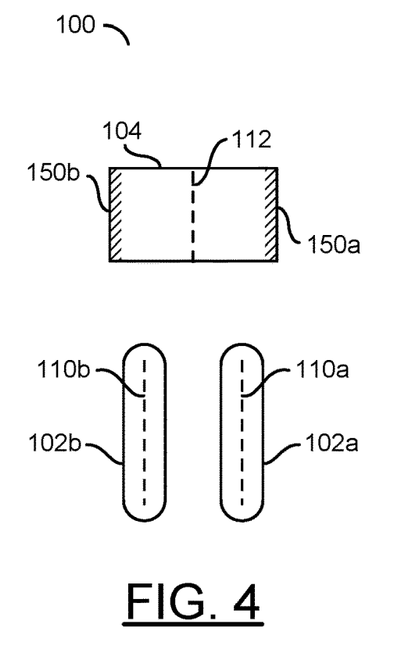
FIG. 4 is a diagram illustrating an example embodiment of linear contacts and a support contact.

Referring to FIG. 4, a diagram illustrating an example embodiment of the apparatus 100 is shown. The example apparatus 100 may be implemented with the linear peaks 110a-110b and the linear peak 112 configured in parallel. The apparatus 100 may provide three linear sections for contact (e.g., to create the plane of support 120).

Edges 150a-150b of the support contact 104 are shown. The support contact 104 may be tallest at the linear peak 112 and lowest at the edges 150a-150b. In the example shown, the support contact 104 may have a dome shape from side-to-side. The low edge 150a of the support contact 104 may be on a side corresponding to the linear contact 102a and the low edge 150b of the support contact 104 may be on a side corresponding to the linear contact 102b.

In various embodiments, formation of a rigid electrical connection to the sensor package 70 may be facilitated by the apparatus 100. In an example, the linear contacts 102a-102b may comprise solder (e.g., preform solder shaped having the linear peaks 110a-110b) that may be placed in contact with contact pads 72a-72b. A reflow operation may be performed to rigidly connect the linear contacts 102a-102b to the terminals 52a-52b in the housing 50. In various embodiments, the linear contacts 102a-102b may provide a rigid constraint of the sensor package 70 over a lifetime of a remote sensor unit (RSU).

Figure 5:
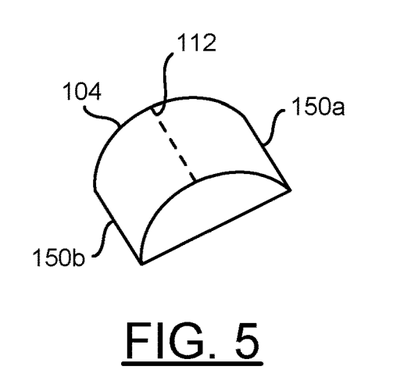
FIG. 5 is a diagram illustrating an example embodiment of a support contact.

Referring to FIG. 5, a diagram illustrating an example embodiment of a support contact 104 is shown. The domed and/or arched shape of the support contact 104 is shown. The linear peak 112 is shown at the apex of the dome. The edges 150a-150b are shown lower than the linear peak 112.

Figure 6:
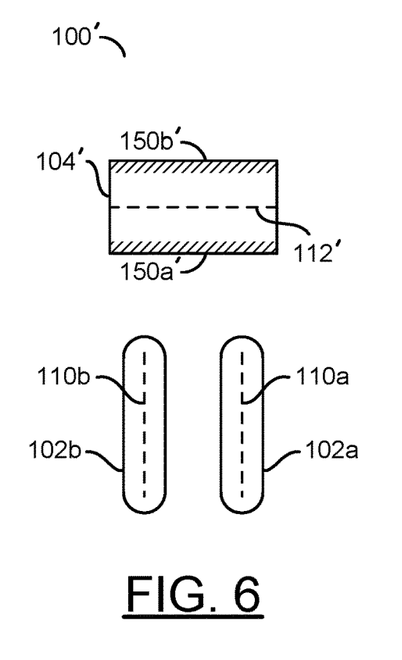
FIG. 6 is a diagram illustrating an alternate embodiment of the apparatus.

Referring to FIG. 6, a diagram illustrating an alternate embodiment of the apparatus 100' is shown. The example apparatus 100' may be implemented with the linear peaks 110a-110b and the linear peak 112' configured in a perpendicular orientation. For example, the linear peak 112' may be perpendicular with respect to both the linear peak 110a and the linear peak 110b. The linear peak 112' may be a linear contact in a different direction than the linear peaks 110a-110b. In the example shown, the linear peaks 110a-110b are shown in a top-to-bottom configuration and the linear peak 112' is shown in a side-to-side configuration. The apparatus 100' may provide three linear sections for contact (e.g., to create the plane of support 120).

Edges 150a'-150b' of the support contact 104' are shown. The support contact 104' may be tallest at the linear peak 112' and lowest at the edges 150a'-150b'. In the example shown, the support contact 104' may have a dome shape from front-to-back. The low edge 150a' of the support contact 104' may be on a side closest to the linear contacts 102a-102b and the low edge 150b' of the support contact 104' may be on a side farthest from the linear contacts 102a-102b.

Figure 7:
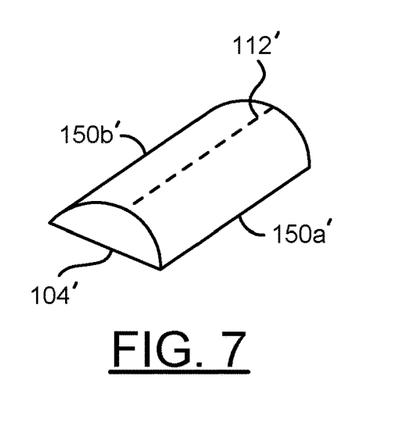
FIG. 7 is a diagram illustrating an alternate embodiment of the support contact.

Referring to FIG. 7, a diagram illustrating an alternate embodiment of the support contact 104' is shown. The domed and/or arched shape of the support contact 104' is shown. The linear peak 112' is shown at the apex of the dome. The edges 150a'-150b' are shown lower than the linear peak 112'.

Figure 8:
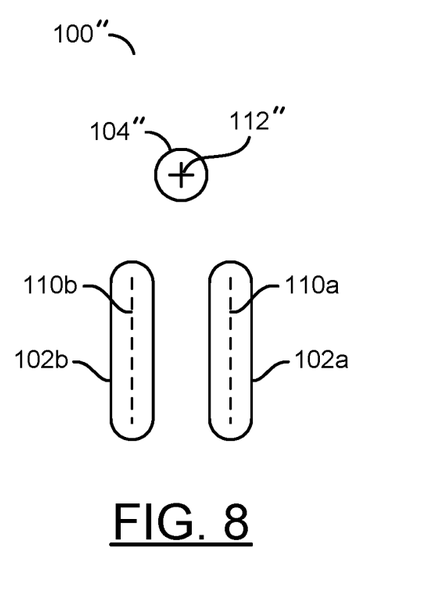
FIG. 8 is a diagram illustrating an embodiment of the apparatus with a modified support contact.

Referring to FIG. 8, a diagram illustrating an embodiment of the apparatus 100" with a modified support contact 104" is shown. The example apparatus 100" may be implemented with the peak 112" implemented as a single point (e.g., instead of a linear section). The apparatus 100" may provide two linear sections for contact and a single point of contact (e.g., to create the plane of support 120). The peak 112" may be located equidistant to each of the linear peaks 110a-110b.

Figure 9:
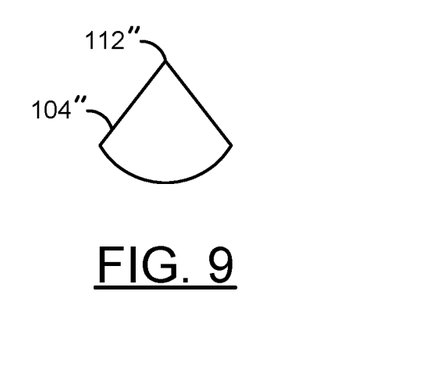
FIG. 9 is a diagram illustrating the modified support contact.

Referring to FIG. 9, a diagram illustrating the modified support contact 104" is shown. The modified support contact 104" may have a conical shape. The radius of the base of the modified support contact 104" may be varied according to the design criteria of a particular implementation. The peak 112" is shown as a point at the top of the modified support contact 104".

Figure 10:
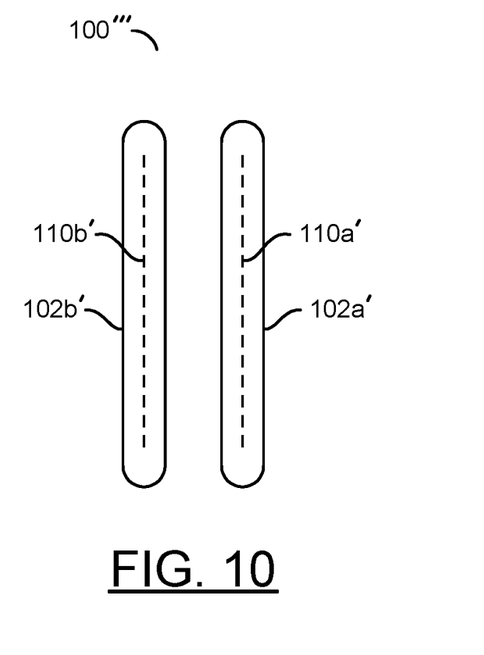
FIG. 10 is a diagram illustrating an embodiment of the apparatus without a support contact.

Referring to FIG. 10, a diagram illustrating an embodiment of the apparatus 100''' is shown. The apparatus 100''' may be implemented without the support contact 104. The apparatus 100''' may comprise the two linear contacts 102a'-102b'. The linear contacts 102a'-102b' may have an extended length. The extended linear contacts 102a'-102b' may have longer linear peaks 110a'-110b'.

The linear peaks 110a'-110b' may contact with the sensor pads 72a-72b and/or the sensor package 70. The extended length of the linear peaks 110a'-110b' may provide enough support to ensure that the sensor package 70 rests on the plane 120. The extended length of the linear peaks 110a'-110b' may provide enough stability for the sensor package 70 without using a third line (or point) of contact.

Figure 11:
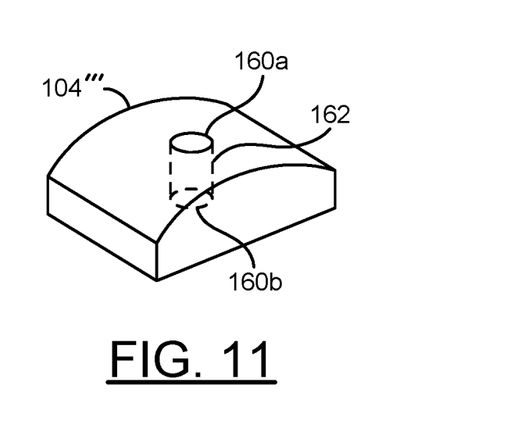
FIG. 11 is a diagram illustrating an example support contact implementing a vent.

Referring to FIG. 11, a diagram illustrating an example support contact 104'''' implementing a vent is shown. The support contact 104'''' may have the domed and/or arched shape. An opening 160a is shown at the top of the support contact 104''''. In the example shown, the opening 160a is shown located at the center of the top surface of the support contact 104''''. The opening 160a may be located at a portion of the linear peak of the support contact 104''''. Generally, the opening 160a may be located anywhere along the linear peak 112 of the support contact 104''''.

An opening 160b is shown on a bottom surface of the support contact 104''''. A hollow cylinder 162 is shown through the support contact 104''''. The openings 160a-160b and the hollow cylinder 162 may form a vent. While the vent is shown having a cylindrical shape, the size and/or shape of the vent may be varied according to the design criteria of a particular implementation.

The vent may provide a path to the sensor package 70 through the support contact 104''''. In some embodiments, the sensor 70 may measure a fluid and/or a gas. The vent may enable a fluid and/or gas to pass through the support contact 104''''. For example, the vent may enable the sensor 70 to measure an amount of pressure.

Figure 12:
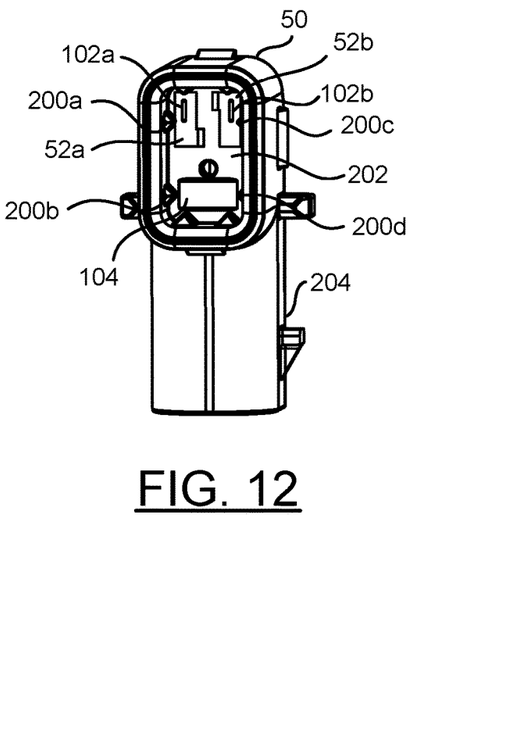
FIG. 12 is a diagram illustrating an embodiment of a sensor housing showing the terminals.

Referring to FIG. 12, a diagram illustrating an embodiment of a sensor housing 50 is shown. The housing 50 may comprise a top section for holding the sensor package 70. A number of holders (or ribs, stops, ledges, etc.) 200a-200d are shown. The holders 200a-200d are shown surrounding a seating area 202. The sensor package 70 may be placed onto the seating area 202. The holders 200a-200d may provide room for the sensor package 70. The holders 200a-200d may be spaced to provide a tight fit for the package 70. The holders 200a-200d may be configured to accept and/or guide an installation of the sensor package 70 and/or hold the sensor package 70 in place in the seating area 202. The holders 200a-200d may be implemented to prevent the sensor package 70 from sliding (e.g., prevent translational movement).

The housing 50 may comprise a connector portion 204. The connector portion 204 may contain the terminals 52a-52b. The terminals 52a-52b may extend as prongs through the connector portion 204. For example, the terminals 52a-52b may be exposed in the seating area 202 to enable a connection to the sensor pads 72a-72b (via the linear contacts 102a-102b) and then extend through the connector portion 204 as prongs to enable connections to external devices.

The housing 50 may be formed of a hard plastic material. The materials used to fabricate the housing 50 may include, but are not limited to, polyamide (NYLON), polybutylene terephthalate (PBT), polypropylene, polyethylene terephthalate (PET), acrylonitrile butadiene styrene (ABS), and/or various alloys and/or fillers of these resins and may be glass filled. The housing 50 may be fabricated by casting, injection molding and/or three-dimensional printing.

The linear contacts 102a-102b are shown in the context of the sensor housing 50. The support contact 104 is shown in the context of the sensor housing 50. The sensor package 70 (not shown) may be placed into the seating area 202 and onto the linear contacts 102a-102b and the support contact 104.

The linear contacts 102a-102b and the support contact 104 are shown surrounded by the holders 200a-200d. The linear contacts 102a-102b may provide the electrical connection between the sensor pads 72a-72b and the terminals 52a-52b. The linear contacts 102a-102b and the support contact 104 may enable the sensor package 70 to be seated on the plane 120 in the seating area 202.

Figure 13:
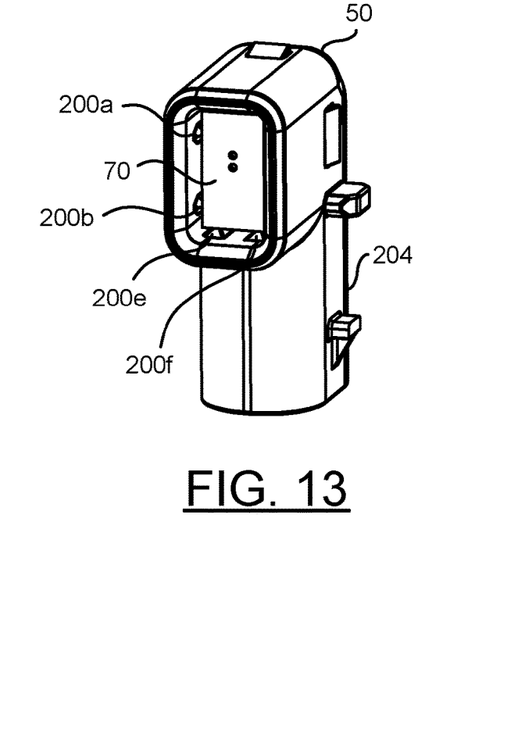
FIG. 13 is a diagram illustrating a sensor package seated in the sensor housing.

Referring to FIG. 13, a diagram illustrating the sensor package 70 seated in the sensor housing 50 is shown. The sensor package 70 may be placed onto the linear contacts 102a-102b and/or the support contact 104 in the seating area 202. The sensor package 70 may sit on the flat plane 120 created by the linear peaks 110a-110b and the linear peak 112. The linear contacts 102a-102b and the support contact 104 may prevent one end of the sensor package 70 from dipping below or rising above the other end of the sensor package 70. Preventing the sensor package 70 from dipping below and/or rising above the other end of the sensor package 70 may prevent a biasing of the sensor package 70 when seated in the housing 50.

The holders 200a-200f may be configured to hold the sensor package 70 in the seating area 202. The holders 200a-200f are shown in contact with the edges of the sensor package 70. By surrounding the edges of the sensor package 70, the holders 200a-200f may prevent the sensor package 70 from sliding along the plane 120.

Figure 14:
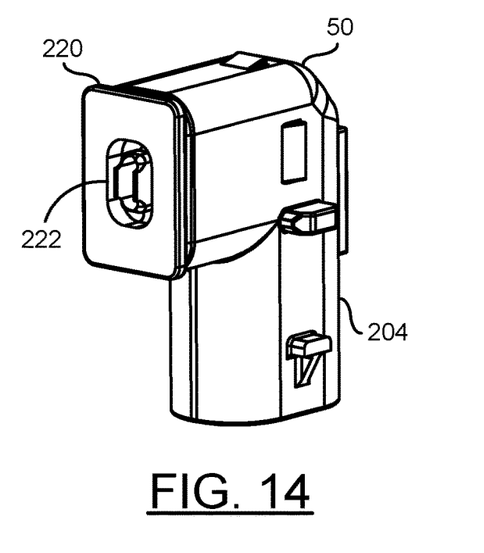
FIG. 14 is a diagram illustrating a gasket providing a compression fit.

Referring to FIG. 14, a diagram illustrating a gasket 220 providing a compression fit is shown. The sensor package 70 may be on the linear contacts 102a-102b and the support contact 104 and surrounded by the holders 200a-200f in the seating area 202. The gasket 220 may be placed on top of the sensor package 70. The gasket 220 may be shaped to fit on top of the sensor package 70 and/or between the holders 200a-200f.

The gasket 220 may provide a secure compression fit for the sensor package 70 within the housing 50. The secure compression fit may prevent a biasing of the sensor package 70 when seated in the housing 50. The gasket 220 may be configured to apply a downward pressure onto the sensor package 70. In some embodiments, the gasket 220 may be implemented as a spring. In some embodiments, the gasket 220 may be implemented using a material that provides a watertight seal. The gasket 220 may be configured to provide a force on the sensor package 70 and/or the sensor pads 72a-72b to press down on the support contact 104 and/or the linear contacts 102a-102b. The downward pressure caused by the gasket 220 may ensure that the sensor package 70 is secured firmly on the plane 120 created by the linear peaks 110a-110b and the linear peak 112.

Figure 15:
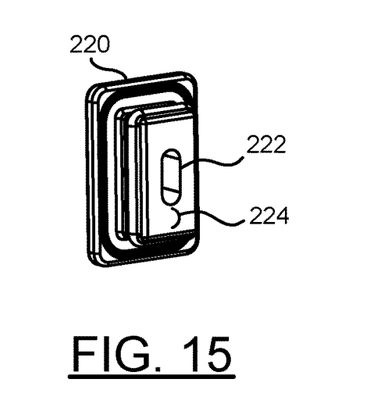
FIG. 15 is a diagram illustrating a gasket.

Referring FIG. 15, a diagram illustrating the gasket 220 is shown. A bottom (e.g., unexposed when installed) side of the gasket 220 is shown. The top (e.g., exposed when installed) side of the gasket 220 may have a larger area than the bottom portion. For example, the top side of the gasket 220 may implement a lip that extends beyond the bottom portion of the gasket 220. The lip may be configured to fit over the edges of the seating area 202. In some embodiments, the gasket 220 may be implemented using a material that provides a watertight seal.

In some embodiments, the gasket 220 may be implemented with a vent hole 222. The passage (or vent) 222 in a center of the gasket 220 generally allows a pressure signal to be transmitted to the pressure sensor from outside the pressure sensor unit. In some embodiments, the vent 222 of the gasket 220 may align with the vent 162 of the support contact 104''' shown in association with FIG. 11. The outer sealing surface may provide an initial barrier between an exterior environment and a pressure sensor inside the pressure sensor unit. The outer sealing surface generally provides an annular compression surface (or region) to engage a sealing portion of the housing assembly. The outer sealing surface may include an angled surface (or region) against which the sealing surface also mates. The angled outer surface generally provides an increased surface-to-surface area to prevent contamination (e.g., water) intrusion. The angled surface may result in smaller high-pressure contact areas where the sealing portion engages the gasket. The angled surface may also increase a sealing force as a pressure differential rises, thereby making the seal more reliable.

In various embodiments, the gasket 220 may be fabricated from a resilient material. The gasket 220 may be fabricated using a two-shot injection molding onto the housing 50, fabricated separately and subsequently placed on the housing 50, or fabricated by common techniques. Material for the gasket 220 may include, but is not limited to, silicone based materials, thermoplastic elastomers (TPE) materials and thermoplastic rubber materials. Other materials may be implemented to meet the design criteria of a particular application. An overall thickness of the gasket 220 may range from approximately 2 millimeters (mm) to approximately 5 mm.

The sensor sealing surface of the gasket 220 may provide an additional barrier between the exterior environment and an active side of the pressure sensor 70. The sensor sealing surface may be raised relative to the surrounding outer sealing surface of the gasket 220. The raised sensor sealing surface generally provides extra compression on the sensor to provide electrical connection as well as deformation that wraps around the sensor thereby creating an additional seal.

In some embodiments, the gasket 220 may comprise a bump (or notch, or nipple, etc.) 224. The bump 224 may be an extrusion from the bottom portion of the gasket 220. The bump 224 may enable additional pressure and/or downward force onto a particular area (or portion) of the sensor package 70. For example, the additional downward force may ensure sufficient force is applied to the end of the sensor package 70 having the sensor pads 72a-72b. Additional force on the end of the sensor package 70 having the sensor pads 72a-72b may ensure a consistent and/or reliable connection with the linear contacts 110a-110b.

Figure 16:
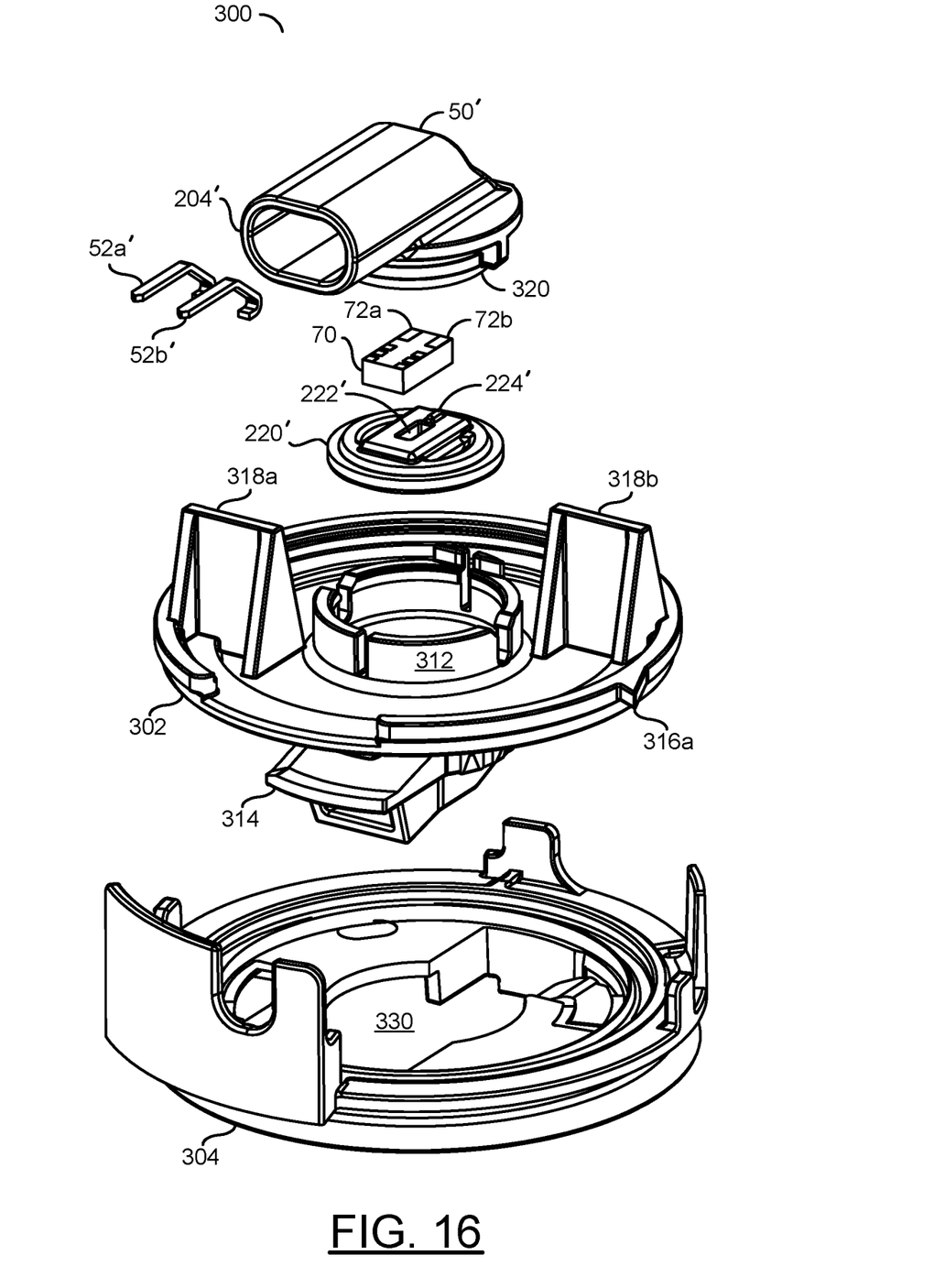
FIG. 16 is a diagram illustrating an embodiment of the invention in the context of a sensor unit.

Referring to FIG. 16, a diagram of a sensor unit 300 is shown in accordance with an embodiment of the invention. The sensor unit 300 generally implements a gas pressure sensor suitable for use in automotive applications. The sensor unit 300 generally comprises a base assembly 302, the housing (e.g., a housing assembly) 50', the gasket 220' and a mounting assembly 304.

The base assembly 302 may include a bearing feature 312, a locking feature 314, one or more teeth 316a-316b, and multiple brackets 318a-318b. A passage may be formed through the base assembly 302 and the locking feature 314. The base assembly 302 may be formed of a hard plastic material and has a generally circular shape. The materials used to fabricate the base assembly 302 may include, but are not limited to, polybutylene terephthalate (PBT) and nylon, and are usually glass filled. The base assembly 302 may be fabricated by injection molding.

The bearing feature 312 may form a ring around the gasket 220'. The bearing feature 312 is generally operational to engage (e.g., snap to) the housing assembly 50'. In various embodiments, the snapping (or locking) may not be reversible. In other embodiments, the bearing feature 312 may be configured to both engage with and disengage from the housing assembly 50' a number of times.

The locking feature 314 may implement a gas coupler (or fitting). The locking feature 314 may be configured to engage and lock to the mounting assembly 304. In various embodiments, the locking feature 314 may provide a surface to connect a hose or pipe containing the gas pressure signal to be measured by the pressure sensor unit 300.

In various embodiments, the base assembly 302 may be configured to secure the pressure sensor unit 300 to a structure of a motor vehicle (e.g., automobile, truck, train and the like). The base assembly 302 may be customized to meet the mounting criteria of a particular application. The uniqueness of the base assembly 302 may result in a family of base assemblies 302.

The housing assembly 50' may include an annular sealing feature 320, the connector 204', the sensor 70 and multiple terminals 52a'-52b'. The housing assembly 50' may be formed of the same hard plastic material used to create the base assembly 302. The sealing feature 320 may be configured to form an environmental seal with the gasket 220' while the housing assembly 50' is mated to the base assembly 302. The sealing feature 320 may also be configured to engage with the bearing feature 312 to hold the housing assembly 50' to the base assembly 302. The connector 204' may be configured to connect to an external electrical connector. The terminals 52a'-52b' may be configured to convey electrical power to the sensor 70 and electrical signals (e.g., sensor readings) from the sensor 70.

The housing assembly 50' may support the sensor 70. In on example, the sensor 70 may be configured to sense a gas (or pneumatic or air) pressure signal. The gas pressure signal may be received from an exterior of the pressure sensor unit 300, through the passage of the base assembly 302, and through the vent passage 222' through the gasket 220'. The pressure sensor 70 is generally operational to convert a measured gas pressure into an electrical signal. The pressure sensor 70 may be fabricated as one or more integrated circuits. Electrical power for the pressure sensor 70 may be received through the terminals 52a'-52b' in the connector portion 204' and up through the seating area 202 (not shown). Measured data generated by the pressure sensor 70 may be transferred out of the pressure sensor unit 300 through the terminals 52a'-52b' via a male-female connection using the connector 204'. The connector portion 204' may be a hollow tube that contains the terminal prongs 52a'-52b'. The connector portion 204' is generally shaped to receive an electrical socket (or plug) configured to make electrical connection(s) between the pins (or terminals) 52a'-52b' and a wiring harness of a vehicle. The connector portion 204' and the terminals 52a'-52b' may implement a male portion of a male-female connector.

In the example shown, the gasket 220' is generally circular in shape. The gasket 220' may comprise a compression (or annual) region, a sloped (or angled) region and a central (or raised) region. The passage (or vent) 222' may extend through the gasket 220', including the central region, and align with the passage in the base assembly 302 and the locking feature 314. The gasket 220' may be mounted on the base assembly 302 within the bearing feature 312. The gasket 220' is generally operational to seal an interior (e.g., the seating area 202) of the housing assembly 50' to the base assembly 302. The gasket 220' may also be operational to seal an active side of the sensor 70 from the interior of the housing assembly 50'.

An opening 330 of the mounting assembly 304 may be shaped to receive the locking feature 314 of the base assembly 302. In various embodiments, the mounting assembly 304 may secure the pressure sensor unit 300 to a structure of a motor vehicle. The mounting assembly 304 may be customized to meet the mounting criteria of a particular application.

A current push in industry is to reduce costs and complexity of automotive safety sensors. A one-product one-process methodology may be employed to create a family of pressure sensor units suitable for multiple installation criteria in multiple types of vehicles. The methodology generally utilizes a common housing assembly 50' with one or more different attachment pieces that make the pressure sensor units 300 complete. The housing assembly 50' and the base assembly 302 may be connected by way of snap fit. The base assembly 302 and the mounting assembly 304 may be connected by a rotational interlock. Mass production of a singular type of housing assembly 50' may allow the cost to be reduced. The method generally allows for a simple manufacturing method with low initial equipment investment as well as very short cycle times.

Figure 17:
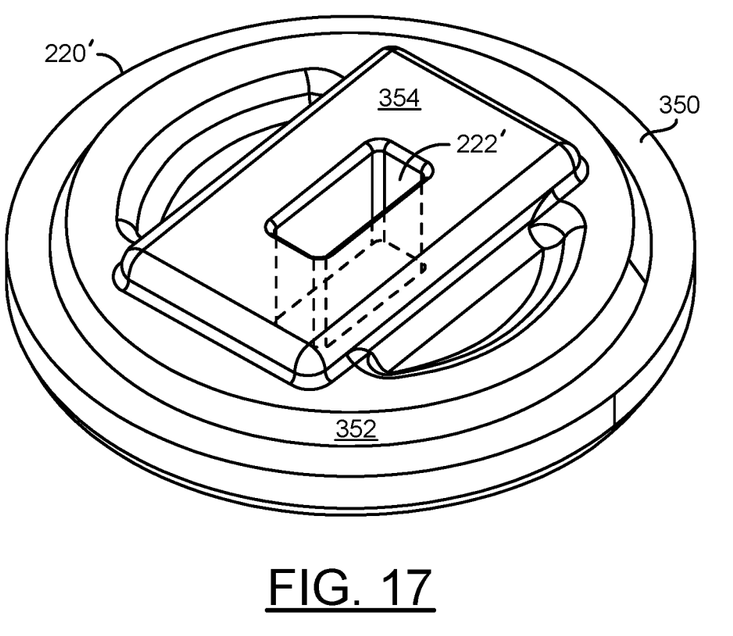
FIG. 17 is a diagram illustrating an alternate embodiment of the gasket.

Referring to FIG. 17, a diagram illustrating an example implementation of the gasket 220' is shown in accordance with an embodiment of the invention. The gasket 220' is generally circular in shape. The gasket 220' generally comprises a compression (or annual) region 350, a sloped (or angled) region 352 and a central (or raised) region 354. The passage (or vent) 222' may extend through the gasket 220', including the central region 354.

The compression region 350 generally extends around an outer perimeter of the gasket 220'. The sloped region 352 may extend around the gasket 220' inside the compression region 350. The angled surface of the sloped region 352 may increase a sealing force as a pressure differential rises, thereby making the seal more reliable.

The central region 354 may be offset perpendicular to the compression region 350 projected toward the sensor package 70. The central region 354 generally has a rectangular shape. An open face of the central region 354 may align and seal to the sensor package 70 while the housing assembly 50' is connected to the base assembly 302.

The passage 222' may be aligned at one end with the passage in the base assembly 302. The passage 222' may be aligned at the opposite end with an active side of the pressure sensor 70. In various embodiments, the gasket 220' may be fabricated from a resilient material. The gasket 220' may be fabricated using a two-shot injection molding onto the base assembly 302, fabricated separately and subsequently placed on the base assembly 302, or fabricated by any common techniques. Material for the gasket 220' may include, but is not limited to, silicone-based materials, thermoplastic elastomers (TPE) materials and thermoplastic rubber materials. Other materials may be implemented to meet the design criteria of a particular application. An overall thickness of the gasket 220' may range from approximately 2 millimeters (mm) to approximately 5 mm. Additional details about the pressure sensor unit 300 may be found in co-pending U.S. application Ser. No. 15/924,896, filed Mar. 19, 2017, which is hereby incorporated by reference in its entirety.

Figure 18:
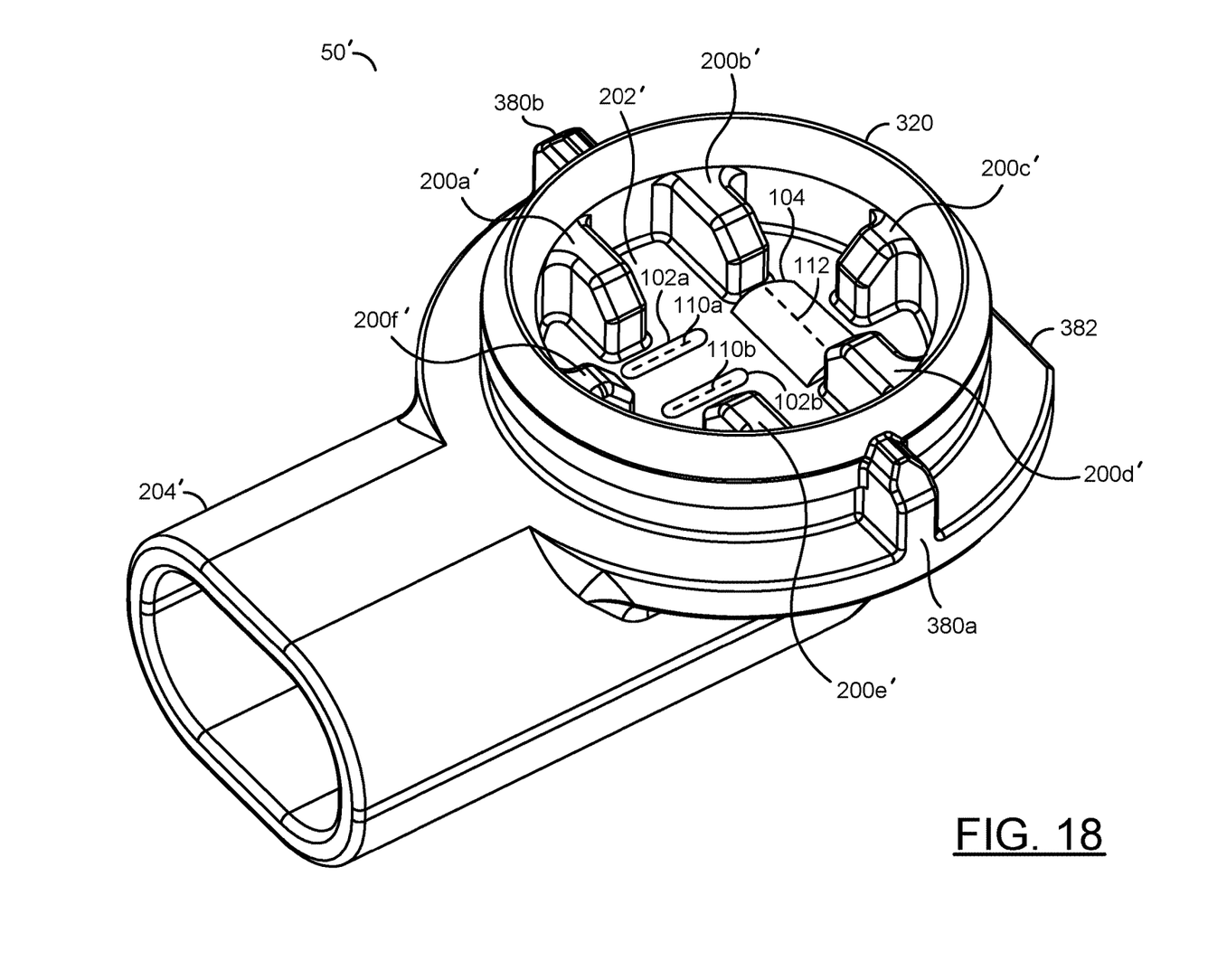
FIG. 18 is a diagram illustrating an alternate embodiment of the sensor housing assembly.

Referring to FIG. 18, a diagram illustrating an example implementation of the housing assembly 50' is shown in accordance with an embodiment of the invention. The housing assembly 50' may include the posts (or holders) 200a'-200f' and multiple (e.g., two) alignment features 380a-380b. The posts 200a'-200f' may be configured to orient and hold the sensor 70 in a proper location and/or orientation to both contact the linear contacts 102a-102b and connect with the passage 222' in the gasket 220'. The posts 200a'-200f' may ensure that the sensor 70 interfaces the electrical and mechanical contact locations in the correspondingly correct location on the sensor 70 (e.g., the sensor pads 72a-72b).

While the housing assembly 50' is mated to the base assembly 302, the alignment features 380a-380b may reside within the slots of the bearing feature 312. An edge 382 of the housing feature 50' may be shaped to allow clearance of a key while the housing assembly 50' is mated to the base assembly 302. If an attempt is made to attach the housing assembly 50' to the base assembly 302 out of the proper orientation, the key may contact the connector 204' and thereby prevent the sealing feature 320 from properly seating in the bearing feature 312. The slots with the alignment features 380a-380b, and/or the key with the edge 382 generally allows the housing assembly 50' and the base assembly 302 to connect in a single orientation.

The seating area 202' is shown. The seating area 202' may comprise the linear contacts 102a-102b, the support contact 104 and/or the holders 200a'-200f'. The holders 200a'-200f' are shown attached to the inner edges of the housing assembly 50'. The sensor package 70 may be placed onto the seating area 202'. The holders 200a'-200f' may provide room for the sensor package 70. The holders 200a'-200f' may be spaced to provide a tight fit for the package 70. The holders 200a'-200f' may be configured to hold the sensor package 70 in place in the seating area 202'. The holders 200a'-200f' may be implemented to prevent the sensor package 70 from sliding (e.g., prevent translational movement). The linear peaks 110a-110b and the linear peak 112 may provide the plane 120 to support the sensor package 70 in the seating area 202'. The linear contacts 102a-102b may provide an electrical connection to the terminals 58a'-58b' (not shown).

Data signals generated by the sensor units may be transferred to one or more electronic control units. The electronic control units may utilize the sensor data in one or more transport vehicle functions including, but not limited to, engine control, transmission control, braking control, battery management, steering control, door control, human machine interface, seat control, speed control, restraint systems control, vehicle-to-vehicle communications and diagnostics. The electronic control units may include capabilities to adjust the sensor data to account for calibration issues, environmental factors and aging components.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    a first linear contact and a second linear contact each connected to corresponding electrical terminals; and
    a support contact connected to a housing, wherein (a) said first linear contact and said second linear contact each provide an electrical connection between corresponding sensor contacts and said corresponding electrical terminals, (b) said first linear contact, said second linear contact and said support contact are arranged to create a support plane for a sensor package, (c) said first linear contact and said second linear contact each provide support for said sensor package along a linear peak and (d) said apparatus enables a secure compression fit of said sensor package within said housing.

2. The apparatus according to claim 1, wherein said first linear contact and said second linear contact each have a domed shape, and said linear peak of said first linear contact and said linear peak of said second linear contact are at an apex of said domed shape.

3. The apparatus according to claim 1, wherein said first linear contact, said second linear contact and said support contact are configured to ensure a reliable electrical connection between said electrical terminals and said sensor contacts.

4. The apparatus according to claim 1, wherein said secure compression fit prevents a biasing of said sensor package when seated in said housing.

5. The apparatus according to claim 1, wherein said linear peak of said first linear contact, said linear peak of said second linear contact and said linear peak of said support contact are configured in a parallel orientation.

6. The apparatus according to claim 1, wherein said linear peak of said support contact is arranged in a perpendicular orientation with respect to said linear peak of said first linear contact and said linear peak of said second linear contact.

7. The apparatus according to claim 1, wherein said support contact has a conical shape with a peak point implemented to provide said support plane for said sensor package.

8. The apparatus according to claim 1, wherein a gasket is implemented to provide a force on said sensor package to press said sensor package onto said first linear contact and said second linear contact.

9. The apparatus according to claim 8, wherein said gasket comprises a nub configured to apply pressure to a portion of said sensor package having said sensor contacts.

10. The apparatus according to claim 1, wherein said housing comprises a plurality of holders arranged around a seating area for said sensor package.

11. The apparatus according to claim 10, wherein said holders are configured to accept said sensor package and prevent a translational movement of said sensor package when seated on said first linear contact and said second linear contact.

12. The apparatus according to claim 1, wherein said support contact comprises a vent configured to enable a fluid to reach said sensor package.

13. The apparatus according to claim 12, wherein (i) said vent comprises a cylindrical tube passing through said support contact and (ii) one opening of said vent is at said linear peak of said support contact.

14. The apparatus according to claim 1, wherein (i) said first linear contact is in contact with a portion of said sensor package on a first side of a surface of said sensor package and (ii) said second linear contact is in contact with a portion of said sensor package on a second side of said surface of said sensor package.

15. The apparatus according to claim 1, wherein said apparatus is implemented as part of a sensor unit for a vehicle.

16. The apparatus according to claim 1, wherein said support contact is implemented as an integrally formed extension of said housing.

17. The apparatus according to claim 1, wherein said support contact is implemented as a separate component from said housing that is attached within a seating area of said housing.

18. The apparatus according to claim 1, wherein said first linear contact and said second linear contact each have a domed rectangular shape, and said linear peak of said first linear contact and said linear peak of said second linear contact run along a length of an apex of said domed rectangular shape of said first linear contact and said second linear contact.

19. The apparatus according to claim 18, wherein said linear peak of said first linear contact and said linear peak of said second linear contact each provide an electrical connection with said corresponding sensor contacts along an entirety of said length of said apex of said domed rectangular shape of said first linear contact and said second linear contact.

20. The apparatus according to claim 18, wherein said linear peak of said first linear contact and said linear peak of said second linear contact partially contact said corresponding sensor contacts and partially contact a plastic housing of said sensor package.

* * * * *